US012769250B2

(12) United States Patent
Chen et al.

(10) Patent No.: US 12,769,250 B2
(45) Date of Patent: Oct. 20, 2026

(54) DEEP LEARNING-BASED DIGITAL HOLOGRAPHIC CONTINUOUS PHASE NOISE REDUCTION METHOD FOR MICROSTRUCTURE MEASUREMENT

(71) Applicant: ZHEJIANG SCI-TECH UNIVERSITY, Zhejiang (CN)

(72) Inventors: Benyong Chen, Zhejiang (CN); Jianjun Tang, Zhejiang (CN); Liping Yan, Zhejiang (CN); Liu Huang, Zhejiang (CN)

(73) Assignee: ZHEJIANG SCI-TECH UNIVERSITY, Zhejiang (CN)

( * ) Notice: Subject to any disclaimer, the term of this patent is extended or adjusted under 35 U.S.C. 154(b) by 294 days.

(21) Appl. No.: 18/599,084

(22) Filed: Mar. 7, 2024

(65) Prior Publication Data

US 2024/0361727 A1 Oct. 31, 2024

Related U.S. Application Data

(63) Continuation of application No. PCT/CN2023/100250, filed on Jun. 14, 2023.

(30) Foreign Application Priority Data

Apr. 28, 2023 (CN) ........................ 202310482708.4

(51) Int. Cl.
*G01B 11/25* (2006.01)
*G02B 27/48* (2006.01)
(Continued)

(52) U.S. Cl.
CPC ....... *G03H 1/0866* (2013.01); *G01B 11/2527* (2013.01); *G03H 1/16* (2013.01); *G02B 27/48* (2013.01); *G03H 2001/0875* (2013.01)

(58) Field of Classification Search
CPC ............ G01B 11/2527; G03H 1/0443; G03H 1/0808; G03H 1/0866; G03H 1/16;
(Continued)

(56) References Cited

U.S. PATENT DOCUMENTS 6,809,845 B1 * 10/2004 Kim .................... G03H 1/0866 359/9
9,360,299 B1 * 6/2016 Kim ...................... G01B 9/021
(Continued)

FOREIGN PATENT DOCUMENTS

CN 114494139 5/2022
CN 115760598 3/2023

OTHER PUBLICATIONS

Wen Xiao et al., "Research on digital holographic detection method based on CAD optical phase model", Modern Electronics Technique, Jun. 15, 2016, with English abstract, pp. 1-5, vol. 39, No. 12.
(Continued)

*Primary Examiner* — Ryan S Dunning
(74) *Attorney, Agent, or Firm* — JCIPRNET

(57) ABSTRACT

A deep learning-based digital holographic continuous phase noise reduction method for microstructure measurement is provided. A MEMS microstructure is simulated to generate an object phase image through generation of random matrix superposition, noise in a digital holographic continuous phase map is simultaneously simulated to generate a noise grayscale image, and a simulation data set is thus created. An end-to-end convolutional neural network is designed, and a trained convolutional neural network is trained and obtained. A holographic interference pattern of an object under measurement is collected by photographing, and after spectrum extraction, angular spectrum diffraction, phase unwrapping, and distortion compensation, a continuous phase map containing only the object phase and noise is obtained and input into the trained convolutional neural
(Continued)

network to obtain an object phase map. A simulation data set is accurately created in the disclosure, thereby the difficulty of collecting a large amount of experimental data is avoided.

9 Claims, 3 Drawing Sheets

(51) Int. Cl.

| | |
|---|---|
| ***G03H 1/04*** | (2006.01) |
| ***G03H 1/08*** | (2006.01) |
| ***G03H 1/16*** | (2006.01) |
| ***G06N 3/02*** | (2006.01) |
| ***G06N 3/045*** | (2023.01) |
| ***G06N 3/0464*** | (2023.01) |
| ***G06N 3/08*** | (2023.01) |
| ***G06T 5/70*** | (2024.01) |

(58) Field of Classification Search
CPC .. G03H 2001/0875; G06N 3/02; G06N 3/045; G06N 3/08; G06T 5/70; G06T 2207/20081; G06T 2207/20084; G02B 27/48
See application file for complete search history.

(56) References Cited

U.S. PATENT DOCUMENTS

| | | | | |
|---|---|---|---|---|
| 2010/0046848 | A1 * | 2/2010 | Witzgall | G06T 9/007 382/248 |
| 2021/0356258 | A1 | 11/2021 | Chen et al. | |

OTHER PUBLICATIONS

"International Search Report (Form PCT/ISA/210) of PCT/CN2023/100250", mailed on Dec. 22, 2023, pp. 1-3.
"Written Opinion of the International Searching Authority (Form PCT/ISA/237) of PCT/CN2023/100250", mailed on Dec. 22, 2023, pp. 1-3.

* cited by examiner

DEEP LEARNING-BASED DIGITAL HOLOGRAPHIC CONTINUOUS PHASE NOISE REDUCTION METHOD FOR MICROSTRUCTURE MEASUREMENT

CROSS-REFERENCE TO RELATED APPLICATION

This application is a continuation of international application of PCT application serial no. PCT/CN2023/100250 filed on Jun. 14, 2023, which claims the priority benefit of China application no. 202310482708.4 filed on Apr. 28, 2023. The entirety of each of the above mentioned patent applications is hereby incorporated by reference herein and made a part of this specification.

TECHNICAL FIELD

The disclosure relates to an object measurement method in the field of digital holography technology, and in particular, relates to a method for object continuous phase map noise reduction using deep learning in digital holography.

DESCRIPTION OF RELATED ART

When the digital holographic (DH) technique is used to measure micro-nano structures, due to factors such as the interference characteristics of the coherent light source, the electronic characteristics of the image acquisition device (CCD), and the rough structure of the surface of the object to be measured, a large amount of noise, including photon noise, electronic noise, quantum noise, and coherent noise, will be introduced into the digital hologram. These noises appear as different shapes of phase noise in the phase map, and the superposition of a large amount of phase noise with the real phase of the object to be measured will seriously affect the quality of phase reconstruction and lower the accuracy of phase measurement. Most current phase filtering methods use the Gaussian noise model as an approximation of speckle noise, but there are many sources of phase noise, which cannot be simulated only by the Gaussian noise model. This is one of the reasons why residual noise still exists in the phase filtering results of these algorithms.

Besides, in the wrapped phase of digital holographic microscopy imaging, there is usually a large amount of phase distortion, and the characteristics of speckle noise are more obvious in the wrapped phase (shown as randomly distributed discontinuous values). For continuous phase noise with small fluctuations between adjacent pixels, its characteristics are often masked by the distorted phase. Most of the current conventional or deep learning-based phase filtering methods usually filter the wrapped phase map, and the phase noise is often masked by a large amount of phase distortion. Alternatively, even if the phase map after distortion compensation is filtered, because the superimposed phase noise is too complex, no suitable filter can filter it out. In the final reconstructed object phase, there is still a large amount of unfiltered phase noise, which restricts the performance of phase filtering.

SUMMARY

In order to solve the above technical problems, the disclosure provides a deep learning-based digital holographic continuous phase noise reduction method for microstructure measurement, in which an end-to-end filtering convolutional neural network combined with a subspace projection method is designed, complex phase noise existing in a continuous phase map of digital holographic experiments can be effectively filtered out, two noise models, Brown and Perlin, are used to accurately simulate digital holographic continuous phase noise, and a large number of mixed data sets are created to train a convolutional neural network to filter out the digital holographic continuous phase noise, so that advantages of good filtering performance, few network parameters, and fast execution speed are provided.

The disclosure is achieved through the following technical solutions:

In step one, a MEMS microstructure is simulated to generate an object phase image through generation of random matrix superposition, noise in a digital holographic continuous phase map is simultaneously simulated to generate a noise grayscale image, the object phase image and the noise grayscale image are added as input data and a pure object phase image is treated as a label to create a large number of simulation data sets, an end-to-end convolutional neural network combined with a subspace projection method is designed, and the simulation data set is input into the convolutional neural network to train the convolutional neural network to obtain a trained convolutional neural network to achieve the noise reduction task.

In step two, a holographic interference pattern of an object under measurement is collected by photographing, object light field complex amplitude U containing information of an object to be measured is obtained through image processing, and phase information in the object light field complex amplitude U is extracted and wrapped between $(-\pi, \pi]$ to obtain a wrapped phase map $\varphi_0$.

In step three, an unwrapping operation is performed on the wrapped phase map $\varphi_0$ to obtain a continuous phase map containing phase distortion, Zernike polynomial fitting is then used to remove the phase distortion, and a continuous phase map containing only an object phase and a noise phase is obtained.

In step four, the continuous phase map is input into the trained convolutional neural network, the trained convolutional neural network model is equivalent to a function mapping relationship, and a noise-reduced object phase map is output. By converting the object phase map into height data, accurate measurement of a micro-nano structure is achieved.

A microstructure standard part is used in the disclosure as the object to be measured, and the holographic interference pattern of a surface of the object to be measured is collected.

The step one specifically is:

1.1) A large number of a plurality of step-like structure images are generated as object phase images by generating non-overlapping random rectangles. A length and a width of each rectangle are preliminarily limited to a value range based on an image size.

1.2) For each object phase image generated in step 1.1), noise grayscale images of a same size are generated based on two noise model algorithms, Brown and Perlin, and a standard deviation of the noise is set to be normalized to a range of 0.05 to 0.26 rad during generation.

The object phase images and the noise grayscale images correspond one to one.

The standard deviation of the digital holographic continuous phase noise to be simulated is obtained based on experimental data and is distributed in a range of 0.1 to 0.15 rad in the disclosure. The standard deviation of the noise generated by the simulation is normalized to a range of 0.05 0.26 rad in the specific implementation, so that the network generalization ability is improved and it is consistent with the actual experimental situation.

1.3) The object phase image generated by simulation and the noise grayscale image are added to obtain a continuous phase map containing noise, the continuous phase map is treated as the input data of the convolutional neural network, the object phase image generated by simulation without being added with noise is treated as a learning label of the convolutional neural network, a simulation data set containing forty thousand pairs of data is created, and the convolutional neural network is then trained to obtain the trained convolutional neural network.

The step 1.1) specifically is:

A grayscale image of MEMS is generated through matlab first, 8 to 64 rectangles are generated in the grayscale image according to the following method, overlapping portions among the rectangles and portions outside the rectangles are set to zero in the grayscale image, and a grayscale image containing a plurality of non-overlapping graphics is obtained as a phase grayscale image simulating a MEMS chip surface structure.

Coordinates in the grayscale image are randomly selected as a vertex of a lower left corner of a rectangle, two random integers limited to a predetermined range are then randomly generated as a length and a width, and a filled rectangle is established.

A mean filter with a window size of 3×3 is finally used on the phase grayscale image to obtain the object phase image.

The convolutional neural network specifically includes a first convolution module, a plurality of consecutive basic convolution layers, a subspace projection layer SSA, a second convolutional module, and an additive layer connected in sequence. The first convolution module receives the continuous phase map input to the convolutional neural network, and output of the first convolution module is input into the plurality of consecutive basic convolution layers. Output of the plurality of consecutive basic convolution layers and the output of the first convolution module are both input to the subspace projection layer SSA for processing. Output of the subspace projection layer SSA is input into the second convolution module. Output of the second convolution module and the continuous phase map input to the convolutional neural network are added through the additive layer as output of the convolutional neural network.

Each basic convolution layer is mainly formed by two consecutive first convolution modules and one additive layer connected in sequence, and input of the basic convolution layer is processed by the two consecutive first convolution modules and then is added to the input of the basic convolution layer itself through the additive layer to act as the output of the basic convolution layer.

The first convolution module is mainly formed by a convolution operation and an activation function connected in sequence.

The second convolution module is mainly formed by a first convolution operation, an activation function, and a second convolution operation connected in sequence.

The subspace projection layer SSA includes a convolution regularization module, a convolution operation, the additive layer, basis vector processing operations Basic Vectors, and a projection operation Projection. The output of the plurality of consecutive basic convolution layers and the output of the first convolution module are spliced first and then input into the convolution regularization module and the convolution operation respectively. Output of the convolution regularization module and output of the convolution operation are added through the additive layer, and a result is then input into the basis vector processing operations Basic Vectors to obtain a basic vector. Output of the basis vector processing operations Basic Vectors and the output of the first convolution module are input to the projection operation Projection together. The projection operation Projection uses the output of the basic vector processing operations Basic Vectors to perform weighted optimization on the output of the first convolution module to obtain the final noise-reduced object phase map.

The convolution regularization module is mainly formed by a first convolution operation, a first BatchNormal batch regularization operation, a first activation function, a second convolution operation, a second BatchNormal batch regularization operation, and a second activation function connected in sequence.

The first step of the disclosure is to design an end-to-end convolutional neural network combined with the subspace projection method, and the network uses dilated convolution to increase the receptive field of the convolution kernel without using downsampling. Further, two noise models, Brown and Perlin, are used to simulate the noise in the digital holographic continuous phase map, and the shape of the noise appears as continuous undulating water waves. The step-like MEMS microstructure is simulated through generation of random matrix superposition. The simulated object phase and simulated noise are added as input data, the object phase without being superimposed with noise is treated as a label to create a large number of simulation data sets, and the convolutional neural network is trained to achieve the noise reduction task.

The step two specifically is:

2.1) A holographic interference pattern of the object to be measured is recorded by using a CCD photosensitive electronic imaging device, a spectrogram is obtained through Fourier transform, a positive first-order spectrum in the spectrogram is extracted, a hologram is reconstructed using inverse Fourier transform, and the reconstructed hologram is diffracted through an angular spectrum diffraction method to obtain the object light field complex amplitude containing the information of the object to be measured.

2.2) An exponential term in the object light field complex amplitude U is extracted and wrapped between $(-\pi, \pi]$ to obtain the wrapped phase map.

The step three specifically is:

3.1) The wrapped phase map is unwrapped to obtain the continuous phase map, and a phase of the object to be measured, a distortion phase, and phase noise are usually included.

3.2) The Zernike polynomial fitting is performed on a continuous phase map $\phi_c$ to obtain a Zernike coefficient of the distortion phase, a distortion phase $\phi_a$ is calculated through the Zernike coefficient obtained by fitting, and the distortion phase $\phi_a$ is subtracted from the unwrapped phase $\phi_c$ finally to obtain a phase image containing the object to be measured and noise.

The step four specifically is: for the trained convolutional neural network model, for each specific continuous phase map to be measured, a noise-reduced object phase map is obtained:

$$Y = \Gamma(\phi),$$

where $\Gamma(\cdot)$ represents the trained convolutional neural network, $\phi$ is the continuous phase map input to the convolutional neural network, and Y is the noise-reduced object phase map output by the convolutional neural network.

An end-to-end convolutional neural network is established in the disclosure, and a large number of mixed data sets are simulated and then trained to obtain a noise reduction model. The holographic interference pattern of the object to be measured is collected, and after spectrum extraction, angular spectrum diffraction, phase unwrapping, and distortion compensation, a continuous phase map containing only the object phase and noise is obtained and input into the trained convolutional neural network. The network outputs the noise-reduced object phase map, which is the object phase map.

Compared to the related art, beneficial effects of the disclosure include the following:

Two noise models, Brown and Perlin, are used in the disclosure to create a simulation data set, thereby the difficulty of collecting a large amount of experimental data is avoided. By adding the subspace projection module to the network structure, the noise reduction performance is significantly improved, the amount of network parameters is reduced, and advantages of fast computing speed and good noise reduction performance are provided.

Two noise models, Brown and Perlin, are used in the disclosure to create a mixed data set, instead of the commonly used Gaussian noise, to simulate the complex phase noise in the continuous phase of the digital holographic experiment. The noise reduction task is achieved by designing and training an end-to-end convolutional neural network using the subspace projection method, and the complex phase noise in the continuous phase map of the digital holographic experiment can be efficiently removed.

The noise reduction process is fully automatic without manual intervention, and there are no predetermined parameters, few network parameters, fast running speed, small residual noise, and complete object detail information.

Table 1 shows Zernike polynomials used in the embodiments.

Figure 2:
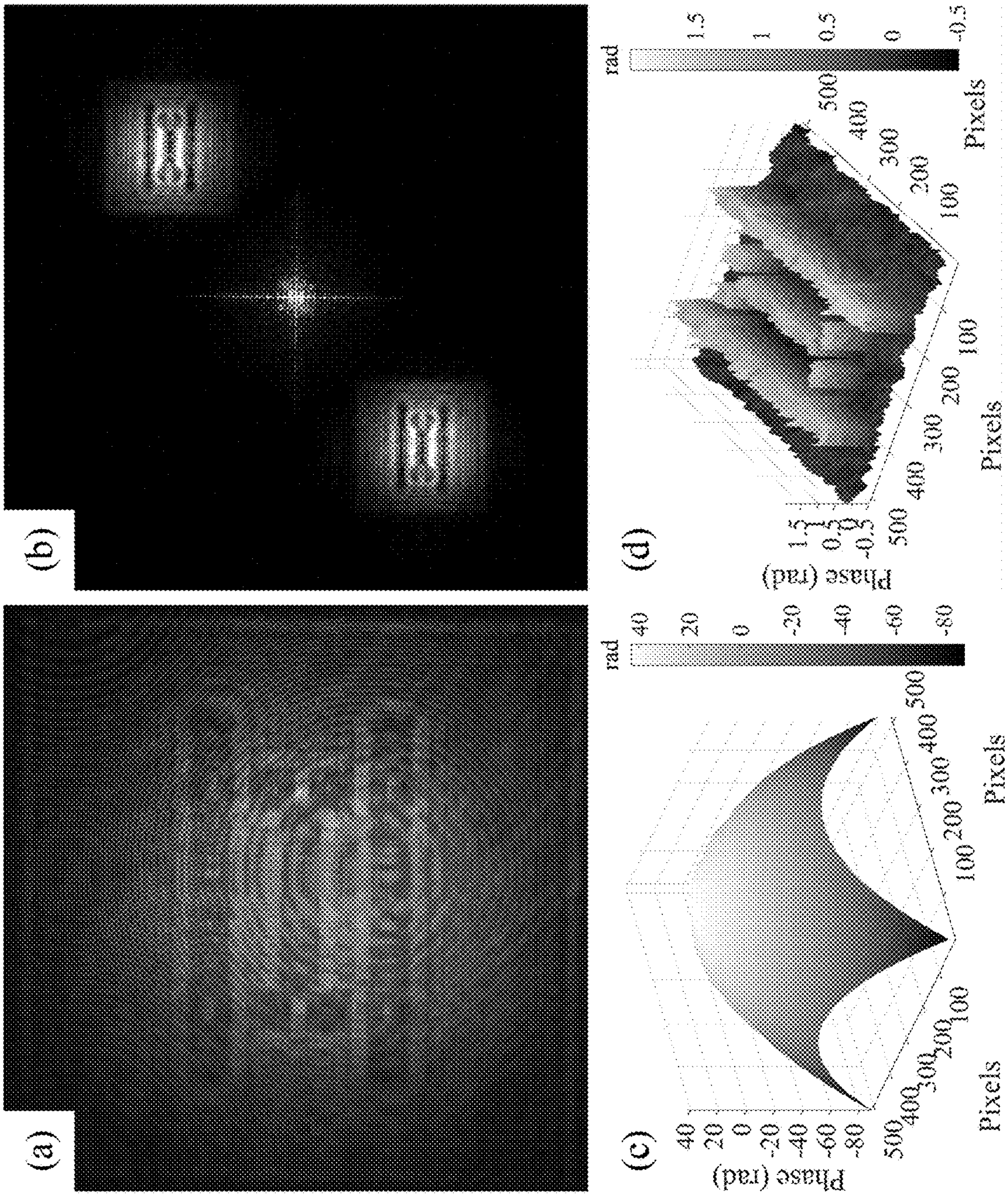

FIG. 2 shows process graphs for processing in the embodiments.

Figure 3:
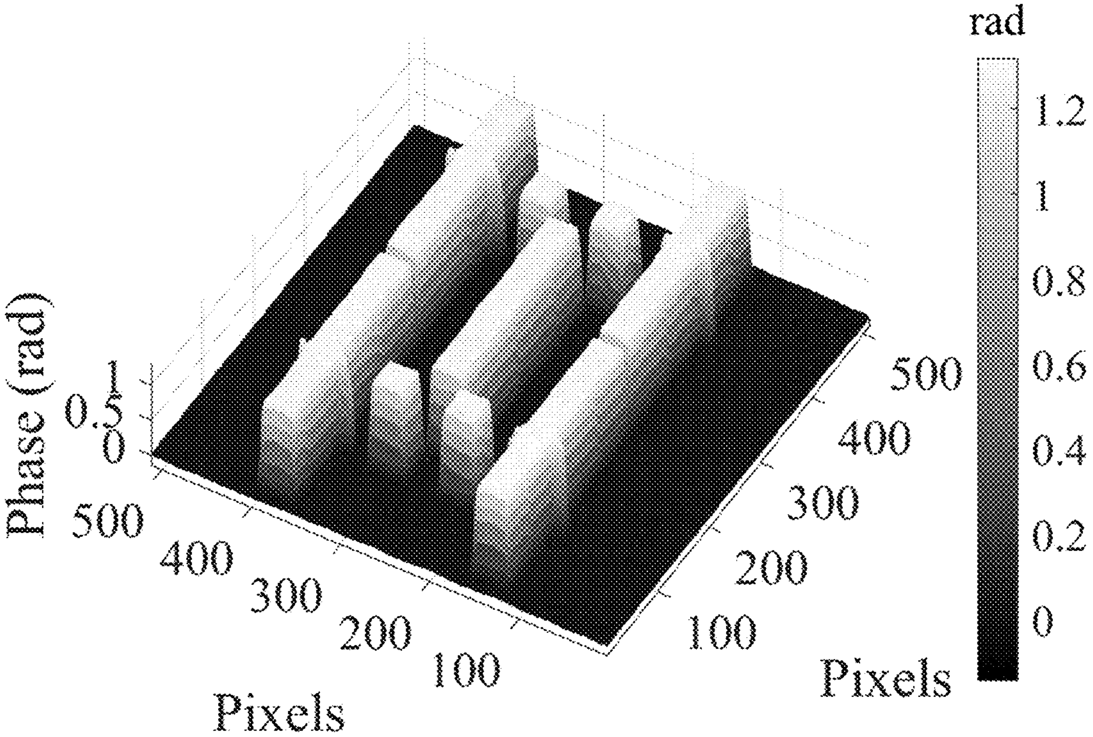

FIG. 3 shows a graph of final phase filtering results in the embodiments.

DESCRIPTION OF THE EMBODIMENTS

The disclosure is further described in detail in combination with accompanying figures and embodiments.

The embodiments of the disclosure are shown in the flow chart of (a) of FIG. 1, and the specific steps are as follows:

In step one, a MEMS microstructure is simulated to generate an object phase image through generation of random matrix superposition, noise in a digital holographic continuous phase map is simultaneously simulated to generate a noise grayscale image, the object phase image and the noise grayscale image are added together with their labels to create a large number of simulation data sets, an end-to-end convolutional neural network combined with a subspace projection method is designed, and the simulation data sets are input into the convolutional neural network to train the convolutional neural network to obtain a trained convolutional neural network to achieve the noise reduction task.

Specific implementation is as follows:

1.1) In the specific implementation, a size of input data of the convolutional neural network is set to M×M. Several grayscale images of MEMS M×M pixel size are first generated through matlab, and 8 to 64 rectangles in each grayscale image are generated according to the following method. The parts inside the rectangles are set to 1 in the grayscale image, the parts overlapping between the rectangles and the parts outside the rectangles are set to zero in the grayscale image, and a grayscale image containing multiple non-overlapping graphics is obtained. That is equivalent to finding the difference set between all rectangles, and as a phase grayscale image simulating a surface structure of a MEMS chip, a grayscale image containing only 0 and 1 is obtained. This image is multiplied by a random number in the range [0, π] to give each image a different phase value:

Coordinates are first randomly selected in a matrix of M×M pixel size, and the coordinates are treated as a vertex of a lower left corner of a rectangle. Two random integers limited to a certain range are then randomly generated as a length and a width, and a filled rectangle is thus obtained.

Finally, a mean filter with a window size of 3×3 is used on the phase grayscale image to reduce an edge gradient and obtain the object phase image, so as to optimize a learning ability of the convolutional neural network on the data set.

1.2) For each object phase image generated in step 1.1), noise grayscale images of the same size M×M is simulated according to two noise model algorithms, Brown and Perlin, which simulate random noise forms in nature, and a standard deviation of the noise to be normalized is set to a range of 0.05 to 0.26 rad during generation.

1.3) The object phase image generated by simulation and the noise grayscale image are added to obtain a continuous phase map containing noise, the continuous phase map is treated as the input data of the convolutional neural network, the object phase image generated by simulation without being added with noise is treated as a learning label of the convolutional neural network, a simulation data set containing forty thousand pairs of data (twenty thousand pairs of data containing Brown noise and twenty thousand pairs of data containing Perlin) is created, and the convolutional neural network is then trained to obtain the trained convolutional neural network.

Step 1.3) When the convolutional neural network is trained, initial parameters of the training are set to: a learning rate of 0.0001, an optimizer is Adam, a loss function is a root mean square error function, and a learning rate decay function is a cosine annealing function. The data set is iteratively trained 20 times.

Figure 1:
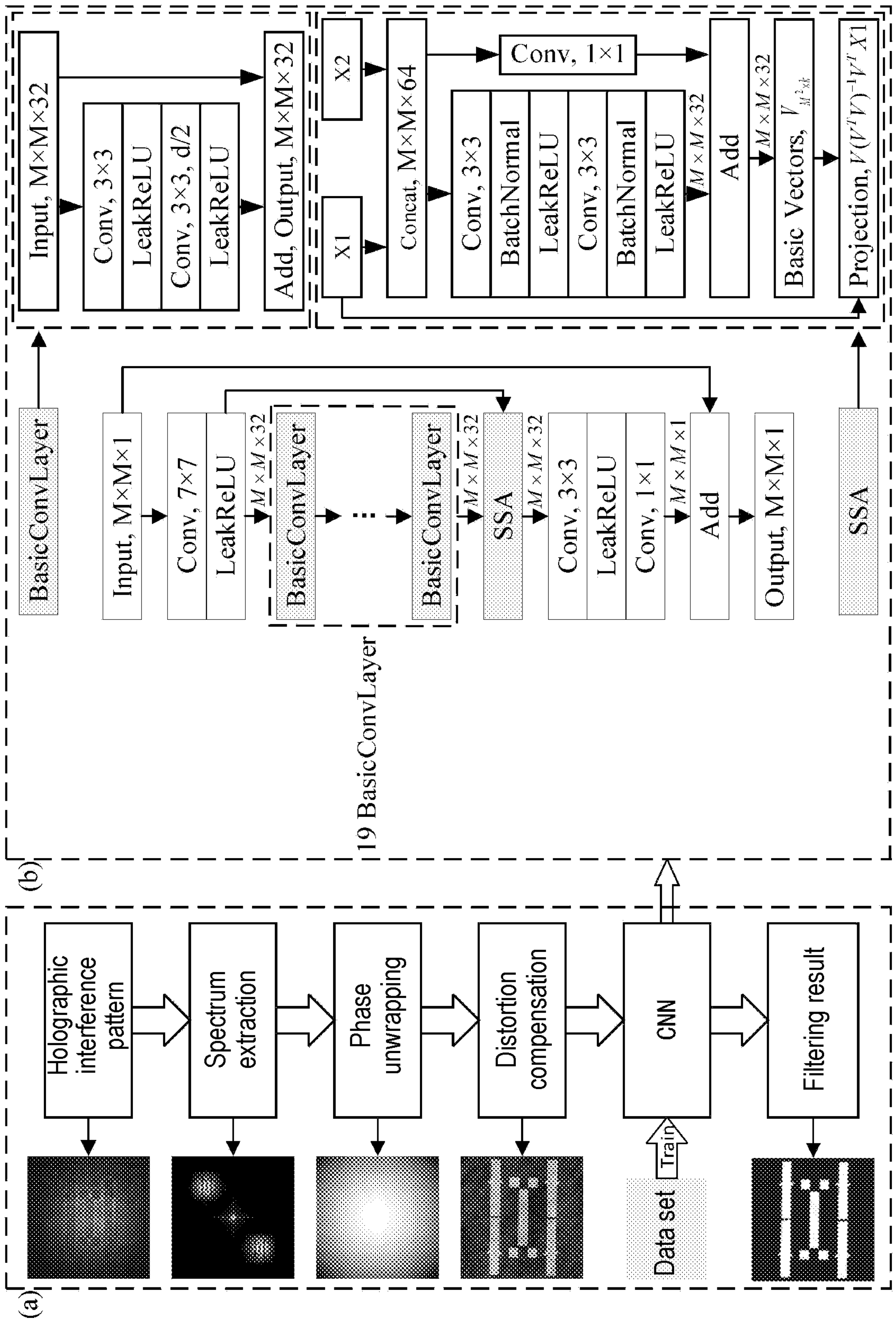
FIG. 1 shows a convolutional neural network structure and a flow chart for processing used in a method of the disclosure.

(b) of FIG. 1 shows the designed convolutional neural network combined with the subspace projection method.

The convolutional neural network specifically includes an input layer, a first convolution module, a plurality of consecutive basic convolution layers, a subspace projection layer SSA, a second convolution module, an additive layer, and an output layer connected in sequence. The first convolution module receives the continuous phase map input to the convolutional neural network, and output of the first convolution module is input into the plurality of consecutive basic convolution layers. Output of the plurality of consecutive basic convolution layers and the output of the first convolution module are both input to the subspace projection layer SSA for processing. Output of the subspace projection layer SSA is input into the second convolution module. Output of the second convolution module and the continuous phase map input to the convolutional neural network are added through the additive layer as output of the convolutional neural network.

Each basic convolution layer is mainly formed by two consecutive first convolution modules and one additive layer connected in sequence, and input of the basic convolution layer is processed by the two consecutive first convolution modules and then is added to the input of the basic convolution layer itself through the additive layer to act as the output of the basic convolution layer.

The first convolution module is mainly formed by a convolution operation and an activation function connected in sequence.

The second convolution module is mainly formed by a first convolution operation, an activation function, and a second convolution operation connected in sequence.

The subspace projection layer SSA includes a convolution regularization module, a convolution operation, the additive layer, basis vector processing operations Basic Vectors, and a projection operation Projection. The output of the plurality of consecutive basic convolution layers and the output of the first convolution module are spliced first and then input into the convolution regularization module and the convolution operation respectively. Output of the convolution regularization module and output of the convolution operation are added through the additive layer, and a result is then input into the basis vector processing operations Basic Vectors to obtain a basic vector. Output X2 of the basis vector processing operations Basic Vectors and the output X1 of the first convolution module are input to the projection operation Projection together. The projection operation Projection uses the output of the basic vector processing operations Basic Vectors to perform weighted optimization on the output X1 of the first convolution module to obtain the final noise-reduced object phase map.

The convolution regularization module is mainly formed by a first convolution operation, a first BatchNormal batch regularization operation, a first activation function, a second convolution operation, a second BatchNormal batch regularization operation, and a second activation function connected in sequence.

For the input phase map containing noise, features are first extracted through a 7×7 convolution kernel and expanded to 32 channels. The features are then extracted through 19 convolution modules with residual structure, and then a subspace projection module is used to separate the features. Finally, the two convolution layers are integrated into a one-channel grayscale image to represent the noise phase and then added to an original input image to output a filtered phase map. A BasicConvLayer residual module is formed by two convolution layers. The first convolution layer uses an ordinary 3×3 convolution kernel, the second convolution layer uses a 3×3 dilated convolution kernel with an expansion coefficient of 2, the activation functions all use LeakReLU, and a negative semi-axis slope is 0.2.

In the subspace projection module, the input low-dimensional feature X1 and high-dimensional feature X2 are first merged and spliced in their channel dimensions. Feature extraction is performed through two basic convolution layers with a size of 3×3 convolution kernel and residual connection, and then the feature map is mapped to k channels, where k is the subspace dimension.

The feature map on each channel is expanded into a one-dimensional vector, and k vectors of size $M^2$ are obtained, where M is the size of the feature map, a set of basic vectors Basic Vectors is obtained, denoted as $V_{M^2\times k}$, and then the projection operation Projection is calculated. The low-dimensional image feature map X1 is projected into the k-dimensional subspace using orthogonal linear projection to separate the signal, expressed as:

$$P = V\left(V^T V\right)^{-1} V^T,$$

where P is an orthogonal projection matrix of a signal subspace, and V represents the basic vectors Basic Vectors.

Finally, the low-dimensional feature map X1 is reconstructed in the signal subspace as:

$$Y = PX_1,$$

in the formula, Y is the final noise-reduced object phase map, which is reconstructed and transformed into a feature map of the same dimension as X1 and is treated as the output of the subspace projection module to the next layer of the convolutional neural network.

In step two, a holographic interference pattern of an object under measurement is collected by photographing, object light field complex amplitude U(x, y) of size M×M containing information of an object to be measured is obtained through image processing, and phase information in the complex amplitude U(x, y)) is extracted and wrapped between (−π, π] to obtain a wrapped phase $\varphi_0$ Specific implementation is as follows:

2.1) A holographic interference pattern of the object to be measured is recorded by using a CCD photosensitive electronic imaging device, a spectrogram is obtained through Fourier transform, a positive first-order spectrum in the spectrogram is extracted, a hologram is reconstructed using inverse Fourier transform, and the reconstructed hologram is diffracted through an angular spectrum diffraction method to obtain the object light field complex amplitude containing the information of the object to be measured. The specific expressions are:

$$\begin{aligned} &U(x, y) = A(x, y)\exp[i\psi(x, y)], \quad x, y = 1, 2, \ldots, M \\ &\psi(x, y) = \phi_o(x, y) + \phi_a(x, y) + \phi_e(x, y) \quad x, y = 1, 2, \ldots, M \end{aligned},$$

where U is the complex amplitude of the object light field, (x, y) is the coordinate point on the two-dimensional plane, i represents an imaginary unit, $i=\sqrt{-1}$, A is the amplitude of the light field, ψ is the phase information, including a phase $\phi_o$ of the object to be measured, distortion phase $\phi_a$, and phase noise $\phi_e$.

2.2) An exponential term in the object light field complex amplitude U is extracted and wrapped between (−π, π] to obtain the wrapped phase map. The specific expression is:

$$\varphi_0(x, y) = \arctan\left\{\frac{\mathrm{Im}[U(x, y)]}{\mathrm{Re}[U(x, y)]}\right\},$$

where $\varphi_0$ is the wrapped phase map, arctan{·} is an arctangent function, Im[·] is an operation of taking an imaginary part, and Re[·] is an operation of taking a real part.

(a) of FIG. 2 shows the microstructure holographic interference pattern collected in this embodiment. (b) of FIG. 2 shows the spectrum obtained by performing Fourier transform on the holographic interference pattern of (a) of FIG. 2. A+1 level spectrum is extracted and inverse Fourier transformed, the angular spectrum diffraction method is used to obtain the distribution of the object light field complex amplitude, and the phase information is extracted and wrapped to obtain a wrapped phase map. (c) of FIG. 2 shows a continuous phase map containing a large amount of phase distortion obtained after unwrapping the wrapped phase map.

In step three, an unwrapping operation is performed on the wrapped phase map $\varphi_0$ to obtain a continuous phase map containing phase distortion, Zernike polynomial fitting is then used to remove the phase distortion, and a continuous phase map containing only an object phase and a noise phase is obtained. Specific implementation is as follows:

3.1) The wrapped phase map is unwrapped using a least squares method to obtain the continuous phase map, and a phase of the object to be measured, a distortion phase, and phase noise are usually included. The specific expression is:

$$\begin{aligned}\phi_c(x, y) &= \text{unwrap}\,[\varphi_0(x, y)] \\ &= \phi_0(x, y) + \phi_a(x, y) + \phi_e(x, y)\text{'}\end{aligned}$$

where $\phi_c$ is the unwrapping phase, a continuous surface, unwrap [·] is the unwrapping operation, $\phi_o$ (x, y)$\phi_a$(x, y) and $\phi_e$ (x, y) are the continuous object phase, distortion phase, and noise phase respectively.

3.2) The Zernike polynomial fitting is performed on a continuous phase map $\phi_c$ to obtain a Zernike coefficient of the distortion phase, a distortion phase $\phi_a$ is calculated through the Zernike coefficient obtained by fitting, and the distortion phase $\phi_a$ is subtracted from the unwrapped phase $\phi_c$ finally to obtain a phase containing the object to be measured and noise. The specific expression is:

$$\phi(x, y) = \phi_c(x, y) - \phi_a(x, y),$$

where $\phi$ is the continuous phase map containing noise that needs to be input into the convolutional neural network model for noise reduction.

TABLE 1

| Polynomial | Cartesian form | Aberration type |
|---|---|---|
| $Z_0$ | 1 | translation |
| $Z_1$ | 2x | x-axis tilt |
| $Z_2$ | 2y | y-axis tilt |
| $Z_3$ | $\sqrt{3}(2x^2 + 2y^2 - 1)$ | defocus |
| $Z_4$ | $\sqrt{6}(2xy)$ | y-axis astigmatism |
| $Z_5$ | $\sqrt{6}(x^2 - y^2)$ | x-axis astigmatism |
| $Z_6$ | $\sqrt{8}(3x^2y + 3y^2 - 2y)$ | y-axis coma |
| $Z_7$ | $\sqrt{8}(3x^3 + 3xy^2 - 2x)$ | x-axis coma |
| $Z_8$ | $\sqrt{8}(3x^2y - y^3)$ | –axis cloverleaf aberration |
| $Z_9$ | $\sqrt{8}(x^3 - 3xy^2)$ | x-axis cloverleaf aberration |

The above Table 1 shows the Zernike polynomials in the Cartesian coordinate system used in this embodiment, and (d) of FIG. 2 shows the continuous phase map containing only the object phase and phase noise obtained after compensating the phase distortion.

In step four, the continuous phase map is input into the trained convolutional neural network, and a network outputs a noise-reduced object phase map. Specific implementation is as follows:

For the trained convolutional neural network model, it is treated as a function mapping relationship, and for each specific continuous phase map to be measured, a noise-reduced object phase map is obtained:

$$Y = \Gamma(\phi),$$

wherein $\Gamma(\cdot)$ represents a trained convolutional neural network model with specific network parameters, $\phi$ is the continuous phase map input to the convolutional neural network, and Y is the noise-reduced object phase map output by the convolutional neural network after processing the input data. Only the object phase information is left, and a shape measurement value may be obtained by converting it into height data.

FIG. 3 shows the noise-containing continuous phase map in (d) of FIG. 2 being input into the trained convolutional neural network, and the network outputs the noise-reduced object phase image.

In view of the problem that it is difficult for the phase filter algorithm to solve the complex noise existing in the digital holographic continuous phase in the related art, by designing a deep convolutional neural network combined with the subspace projection method and using two noise models, Brown and Perlin, to simulate the noise in the digital holographic continuous phase, a large number of data sets are produced to train the designed convolutional neural network in the disclosure. The purpose of efficiently filtering out phase noise in digital holographic experiments is achieved, and the accuracy of digital holographic phase measurement is significantly improved.

What is claimed is:

1. A deep learning-based digital holographic continuous phase noise reduction method for microstructure measurement, wherein:

step one: simulating a MEMS microstructure to generate an object phase image through generation of random matrix superposition and simultaneously simulating noise in a digital holographic continuous phase map to generate a noise grayscale image, adding the object phase image and the noise grayscale image as input data, treating the object phase image as a label to create a simulation data set, designing an end-to-end convolutional neural network combined with a subspace projection method, and inputting the simulation data set into the convolutional neural network to train the convolutional neural network to obtain a trained convolutional neural network;

step two: collecting a holographic interference pattern of an object under measurement by photographing, obtaining object light field complex amplitude U containing information of an object to be measured through image processing, and extracting and wrapping phase information in the object light field complex amplitude U between $(-\pi, \pi]$ to obtain a wrapped phase map $\varphi_0$:

step three: performing an unwrapping operation on the wrapped phase map $\varphi_0$ to obtain a continuous phase map containing phase distortion, using Zernike polynomial fitting to remove the phase distortion, and obtaining a continuous phase map containing only an object phase and a noise phase; and step four: inputting the continuous phase map into the trained convolutional neural network and outputting a noise-reduced object phase map.

2. The deep learning-based digital holographic continuous phase noise reduction method for microstructure measurement according to claim 1, wherein: the step one specifically is:

1.1) generating a plurality of step-like structure images as the object phase image by generating non-overlapping random rectangles;

1.2) for each object phase image generated in step 1.1), generating the noise grayscale image of a same size based on two noise model algorithms, Brown and Perlin, and setting a standard deviation of the noise to be normalized to a range of 0.05 to 0.26rad during generation; and 1.3) adding the object phase image generated by simulation and the noise grayscale image to obtain the continuous phase map containing noise, treating the continuous phase map as the input data of the convolutional neural network, treating the object phase image generated by simulation without being added with noise as a learning label of the convolutional neural network, creating the simulation data set, and then training the convolutional neural network to obtain the trained convolutional neural network.

3. The deep learning-based digital holographic continuous phase noise reduction method for microstructure measurement according to claim 2, wherein: the step 1.1) specifically is:

generating a grayscale image of MEMS through matlab first, generating 8 to 64 rectangles in the grayscale image according to the following method, setting overlapping portions among the rectangles and portions outside the rectangles to zero in the grayscale image, and obtaining a grayscale image containing a plurality of non-overlapping graphics as a phase grayscale image simulating a MEMS chip surface structure;

randomly selecting coordinates in the grayscale image as a vertex of a lower left corner of a rectangle, then randomly generating two random integers limited to a predetermined range as a length and a width, and establishing a filled rectangle; and finally using a mean filter with a window size of 3×3 on the phase grayscale image to obtain the object phase image.

4. The deep learning-based digital holographic continuous phase noise reduction method for microstructure measurement according to claim 1, wherein: the convolutional neural network specifically comprises a first convolution module, a plurality of consecutive basic convolution layers, a subspace projection layer SSA, a second convolutional module, and an additive layer connected in sequence, the first convolution module receives the continuous phase map input to the convolutional neural network, output of the first convolution module is input into the plurality of consecutive basic convolution layers, output of the plurality of consecutive basic convolution layers and the output of the first convolution module are both input to the subspace projection layer SSA for processing, output of the subspace projection layer SSA is input into the second convolution module, and output of the second convolution module and the continuous phase map input to the convolutional neural network are added through the additive layer as output of the convolutional neural network.

5. The deep learning-based digital holographic continuous phase noise reduction method for microstructure measurement according to claim 4, wherein: each basic convolution layer is mainly formed by two consecutive first convolution modules and one additive layer connected in sequence, and input of the basic convolution layer is processed by the two consecutive first convolution modules and then is added to the input of the basic convolution layer itself through the additive layer to act as the output of the basic convolution layer.

6. The deep learning-based digital holographic continuous phase noise reduction method for microstructure measurement according to claim 4, wherein: the subspace projection layer SSA comprises a convolution regularization module, a convolution operation, the additive layer, basis vector processing operations Basic Vectors, and a projection operation Projection, the output of the plurality of consecutive basic convolution layers and the output of the first convolution module are spliced first and then input into the convolution regularization module and the convolution operation respectively, output of the convolution regularization module and output of the convolution operation are added through the additive layer, and a result is then input into the basis vector processing operations Basic Vectors, output of the basis vector processing operations Basic Vectors and the output of the first convolution module are input to the projection operation Projection together, and the projection operation Projection uses the output of the basic vector processing operations Basic Vectors to perform weighted optimization on the output of the first convolution module to obtain the final noise-reduced object phase map, the convolution regularization module is mainly formed by a first convolution operation, a first BatchNormal batch regularization operation, a first activation function, a second convolution operation, a second BatchNormal batch regularization operation, and a second activation function connected in sequence.

7. The deep learning-based digital holographic continuous phase noise reduction method for microstructure measurement according to claim 1, wherein: the step two specifically is:

2.1) recording a holographic interference pattern of the object to be measured by using a CCD photosensitive electronic imaging device, obtaining a spectrogram through Fourier transform, extracting a positive first-order spectrum in the spectrogram, reconstructing a hologram using inverse Fourier transform, and diffracting the reconstructed hologram through an angular spectrum diffraction method to obtain the object light field complex amplitude containing the information of the object to be measured; and 2.2) extracting and wrapping an exponential term in the object light field complex amplitude U between $(-\pi, \pi]$ to obtain the wrapped phase map.

8. The deep learning-based digital holographic continuous phase noise reduction method for microstructure measurement according to claim 1, wherein: the step three specifically is:

3.1) unwrapping the wrapped phase map to obtain the continuous phase map, wherein a phase of the object to be measured, a distortion phase, and phase noise are usually comprised; and 3.2) performing the Zernike polynomial fitting on a continuous phase map $\phi_c$ to obtain a Zernike coefficient of the distortion phase, calculating the distortion phase $\phi_a$ through the Zernike coefficient obtained by fitting, and finally subtracting the distortion phase $\phi_a$ from the unwrapped phase $\phi_c$ to obtain a phase image containing the object to be measured and noise.

9. The deep learning-based digital holographic continuous phase noise reduction method for microstructure measurement according to claim 1, wherein: the step four specifically is: for the trained convolutional neural network model, for each specific continuous phase map to be measured, obtaining a noise-reduced object phase map:

$$Y = \Gamma(\phi),$$

wherein τ(·) represents the trained convolutional neural network, Γ is the continuous phase map input to the convolutional neural network, and Y is the noise-reduced object phase map output by the convolutional neural network.

* * * * *